(12) United States Patent
Wang et al.

(10) Patent No.: US 6,761,839 B2
(45) Date of Patent: Jul. 13, 2004

(54) MATERIAL FOR MAKING HYPER FREQUENCY MULTI-LAYER CHIP INDUCTORS WITH HIGH PERFORMANCE AND LOW SINTERING TEMPERATURE AND A PROCESS FOR PREPARING THE MATERIAL

(76) Inventors: Xiaohui Wang, Department of Materials Science and Engineering Tsinghua University, Beijing, 100084 (CN); Longtu Li, Department of Materials Science & Engineering Tsinghua University, Beijing, 100084 (CN); Ji Zhou, Department of Materials Science & Engineering Tsinghua University, Beijing, 100084 (CN); Zhengxing Yue, Department of Materials Science & Engineering Tsinghua University, Beijing, 100084 (CN); Zhenwei Ma, Department of Materials Science & Engineering, Beijing, 100084 (CN); Shuiyuan Su, Department of Materials Science & Engineering Tsinghua University, Beijing, 100084 (CN)

(*) Notice: Subject to any disclaimer, the term of this patent is extended or adjusted under 35 U.S.C. 154(b) by 319 days.

(21) Appl. No.: 09/939,916

(22) Filed: Aug. 27, 2001

(65) Prior Publication Data

US 2002/0108677 A1 Aug. 15, 2002

(30) Foreign Application Priority Data

Aug. 25, 2000 (CN) .......................................... 00 123598

(51) Int. Cl.$^7$ ........................... H01B 1/08; C04B 35/26; H01F 1/00
(52) U.S. Cl. ............................. 252/519.51; 252/521.2; 252/62.63
(58) Field of Search ........................ 252/519.51, 521.2, 252/62.63

(56) References Cited

FOREIGN PATENT DOCUMENTS

| CN | 1208020 | * | 2/1999 |
| JP | 09167703 | * | 6/1997 |

OTHER PUBLICATIONS

"Study of low-temperature sintering Z-type hexaferrites", Zhang, H. G.; Zhou, J.; Yue, Z. X,; Gui, Z. L.; Li, L.T.Proceedings of the China International Conference on High-Performance Ceramics, 1st Beijing, China, Oct. 31–Nov. 3, 1998 (1999).*

* cited by examiner

Primary Examiner—Mark Kopec
(74) Attorney, Agent, or Firm—Cohen, Pontani, Lieberman & Pavane

(57) ABSTRACT

A composition of material used for making hfMLCIs having a sintering temperature below 1000°. The composition comprises a major component and a minor component, said major component being a general formula: $Ba_3Co_{2-x-y}Zn_xCu_yMn_xFe_{24-z-w}O_{41}$, wherein x, z, w,=0–1.0 and y=0–0.8, and said minor component comprising at least one compound selected from the group of $Bi_2O_3$, $V_2O_5$, PbO, $B_2O_3$, Lif and $CaF_2$. HfMLCIs made from the composition of the present invention are capable of functioning in the frequency region of 300–800 MHz.

4 Claims, 8 Drawing Sheets

MATERIAL FOR MAKING HYPER FREQUENCY MULTI-LAYER CHIP INDUCTORS WITH HIGH PERFORMANCE AND LOW SINTERING TEMPERATURE AND A PROCESS FOR PREPARING THE MATERIAL

BACKGROUND OF THE INVENTION

1. Field of the Invention

The present invention relates to a new material used in manufacturing surface mounting devices and a process of making said material. Particularly, the invention pertains to a material for making high performance hyper frequency multi layer chip inductors, which can be sintered at a low temperature.

2. Description of the Related Art

Multilayer chip inductors ("MLCI"), also known as multilayer ferrite inductors ("MLFI"), are one of the most important surface mounting devices ("SMDS"). The key technical aspect is the co-firing between ferrite and an internal conducting material, such as silver (Ag, chosen for its good conductivity and lower costs). It requires the ferrite to have a low sintering temperature and a high initial permeability. The main materials currently available for manufacturing SMDS are Ni—Zn—Cu ferrite sintered at 850–900° C. and low dielectric constant ceramics. The Ni—Zn—Cu ferrite, has a resonant frequencies below 200 MHz, which may reach 300 MHz if Zn is excluded from the ferrite. Thus, Zi—Zn—Cu ferrite is not suitable for making MLCIs operating in hyper frequencies (300–1000 MHz). On the other hand, low dielectric constant ceramics, with a permeability equal to 1, has been used for making MLCIs operating in ultra high frequencies (>800 MHz), where high inductance is not required. Therefore, there is no ideal material for making MLCI operating in the frequency region from 300–800 MHz.

In 1950's, Philip developed $Co_2Z$ hexaferrite ($Ba_3Co_2Fe_{24}O_{41}$). It generally has a high sintering temperature (~1300° C.). Recently, it was found that using a chemical synthetic method with citrate precursor could be used to prepare $Co_2Z$ hexaferrite with a lower formation temperature (~1150° C.). The chemical synthetic method also improves compositional homogeneity, which is particularly important for doping elements. However, to the applicants' knowledge, no one has taught or suggested any $CO_2Z$ hexaferrite which can be sintered at a temperature below 900° C.

SUMMARY OF THE INVENTION

The present invention discloses a new material composition used in making high performance hyper frequency multiplayer chip inductors ("hfMLCI") and a process of preparing said composition. The composition of the present invention can be sintered under 900° C. so that the hfMLCI made from this material is suitable for the frequency region of 300–1000 MHz with better inductance and reliability, and can be manufactured with relative lower costs.

The composition of the present invention has a major component and minor component. The major component accounts for 88–99% by weight and the minor component accounts for 1–12% by weight. The major component is Z-type planar hexaferrite having a general formula of $Ba_3Co_{2-x-y}Zn_xCu_yMn_zFe_{24-z-w}O_{41-3/2(z+w)}$, wherein $0 \leq x \leq 1.0$, $0 \leq y \leq 0.8$, $0 \leq z \leq 1.0$ and $0 \leq w \leq 1.0$. The minor component acts as a sintering aid, having a formulation of $aBi_2O_3+bV_2O_5+cPbO+dB_2O_3+eLiF+fCaF_2$, where $0 \leq a \leq 1$, $0 \leq b \leq 1$, $0 \leq c \leq 1$, $0 \leq d \leq 1$, $0 \leq e \leq 1$, $0 \leq f \leq 1$.

The composition of the present invention can be prepared by following the steps described below:

(1) weigh out each salt to prepare a solution contain $Fe^{3+}$, $Co^{2+}$, $Ba^{2+}$, $Zn^{2+}$, $Cu^{2+}$, $Mn^{2+}$ in predetermined molar ratios, with $Fe^{3+}$'s concentration being 0.4–5 M;

(2) dissolve $Fe^{3+}$ salt in water and add $NH_4OH$ of an equal molar number to precipitate $Fe(OH)_3$, collect $Fe(OH)_3$ by filtration and wash it with water, and then dissolve the freshly prepared $Fe(OH)_3$ in a citric acid solution ($Fe^{3+}$/citric acid mole ratio should be 1–2) at 60–80° C. with stirring until the solution becomes transparent;

(3) add all the remaining salts weighed out in step (1), that is, all the salts except Fe3+, to the solution prepared in step (2), add $NH_4OH$ to adjust the pH to 6.0–8.0, and wait for about 2 hours until the solution becomes sol;

(4) incubate the sol obtained in step (3) in an oven at 130–150° C. until it dries up;

(5) heat-treat the dried-up gel at 900–1250° C. for 2–6 hours to obtain Z-type hexaferrite powder;

(6) mix the Z-type hexaferrite powder with the sintering aids, i.e., the minor component of a predetermined formulation, grind the mixture in water or alcohol in a ball mill;

(7) dry up the ground mixture at 80–120° C., sieved and press into pellets; and (8) sinter the pellets at 900–1250° C. to obtain the composition of the present invention.

It is also contemplated that the above described procedure can be varied without departing the present invention. For example, although the above procedure stated that $Fe^{3+}$ was first precipitated with $NH_4OH$ before mixing with the other salts weighed out in step (1), it is possible that Fe3+ is first mixed all the other salts in a solution and then added with citric acid and $NH_4OH$, with the resulting solution being used to continue in steps (4)–(8). Another possible variation lies in step (6). While in the above specified procedure the Z-type hexaferrite powder obtained in step (5) is first mixed with the sintering aids before grinding in a ball mill, it is entirely possible that the Z-type hexaferrite is ground alone and dispersed into ethylene glycol and then mixed with a solution of the sintering aids which, after adjusting the pH, forms a hydroxide coating on the surface of the Z-type hexaferrite particles.

Other objects and features of the present invention will become apparent from the following detailed description considered in conjunction with the accompanying drawings. It is to be understood, however, that the description and drawings are provided solely for purposes of illustration and not as a definition of the limits of the invention, for which reference should be made to the claims.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, like reference characters denote similar elements throughout the several views.

DETAILED DESCRIPTION OF THE PRESENTLY PREFERRED EMBODIMENTS

Property Measurement

The magnetic properties were measured using a HP 4291B RF impedance analyzer from 1 MHz to 1800 MHz. The d.c. resistivity at room temperature was measured by HP 4140B using disk sample with silver paste on both sides. The magnetic temperature characteristics were measured at 4 MHz with a HP 4192A LF impedance analyzer at temperatures ranging from −50° C. to 150° C.

EXAMPLE 1

In this embodiment, the material composition is to be made from substantially pure $Co_2Z$ hexaferrite as the major component and $Bi_2O_3$ as the minor component (sintering aid). 96.96 grams of $Fe(NO_3)_3 \cdot 9H_2O$ are dissolved in water and an appropriate amount of $NH_4OH$ is added to the solution to precipitate $Fe(OH)_3$. The $Fe(OH)_3$ precipitate is then dissolved in a solution containing 55 grams of citric acid. Upon the citric acid solution becoming transparent, 5.82 grams of $Co(NO_3)_2 \cdot 6H_2O$ and 7.68 grams of $Ba(CH_3COO)_2$ are added. After adjusting the pH to 6–8, the solution becomes a dark-brown sol, which is dried up and calcined at an appropriated temperature to produce dark $Co_2Z$ (Z-type hexaferrite) in formula $Ba_3CO_2Fe_{24}O_{41}$ powder 20 grams of the $Co_2Z$ powder and an appropriate amount of $Bi_2O_3$ are mixed so that the ratio of $Co_2Z$ over $Bi_2O_3$ is 93:5 by weight. The mixture is ground with iron balls, dried, and pressed into either a disk form or a toroidal form (disks with a outside diameter of 10 mm and a thickness of 1 mm, formed under a pressure of about 2 MPa, or toroidals with a outside diameter of 20 mm, an inside diameter of 10 mm and a thickness of 3 mm, formed under a pressure of about 7 MPa). The disks or toroidals are sintered at 890° C. (sample 1-1), 920° C. (sample 1-2) or 950° C. (sample 1-3).

Figure 1:
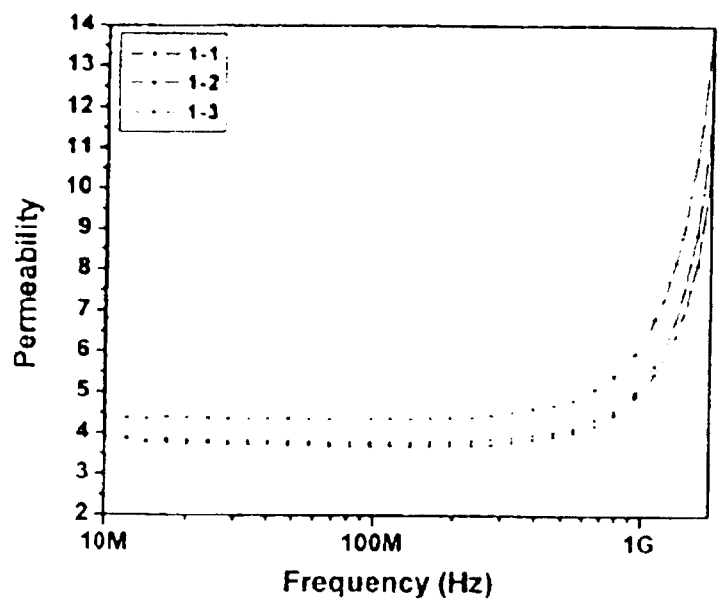
FIG. 1 depicts the relationship between the permeability and the frequency for samples 1-1,1-2, and 1-3 made according to the present invention.
Figure 2:
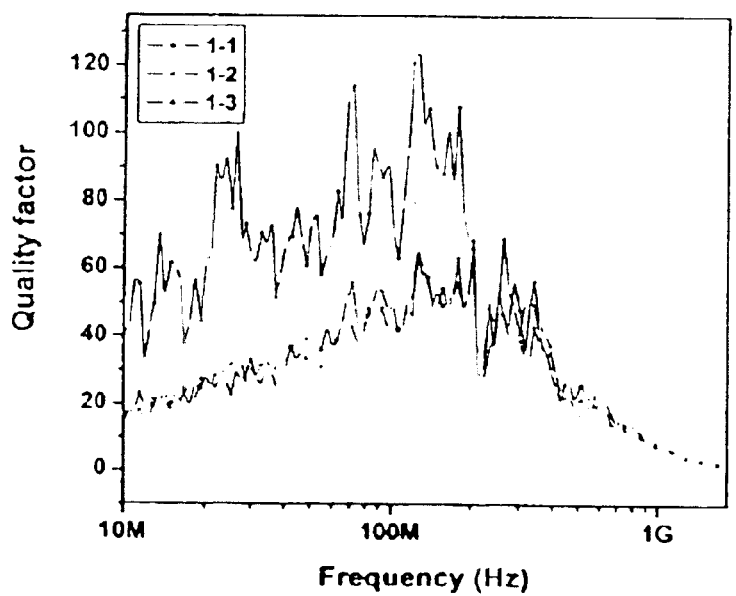
FIG. 2 depicts the relationship between the quality factor and the frequency for samples 1-1,1-2, and 1-3 made according to the present invention.

Referring to FIG. 1 and FIG. 2, the initial permeability and quality factor over a range of frequencies are shown for samples 1-1,1-2 and 1-3. FIG. 1 shows that for all the samples the initial permeability is above 4 and the cut-off frequency is above 1800 MHz. FIG. 2 shows that the quality factor at 300 MHz is around 40 for all the samples. The main electric-magnetic properties of the samples are summarized in Table 1, where $\mu_i$ is initial permeability, Q is quality factor, $(\alpha\mu)_{rel}$ is relative temperature coefficient of inductance, and ρ is insulation resistivity.

TABLE I

| Sample | Condition | $\mu_I$ | Q (300 MHz) | $(\alpha_\mu)_{rel}$(/° C.) | ρ (Ω.cm) |
|---|---|---|---|---|---|
| 1-1 | 890° C./6 h | 3.7 | 40 | $1.5 \times 10^{-6}$ | $4.4 \times 10^8$ |
| 1-2 | 920° C./6 h | 3.8 | 42 | $9.8 \times 10^{-7}$ | $6.1 \times 10^8$ |
| 1-3 | 950° C./6 h | 4.6 | 50 | $1.7 \times 10^{-6}$ | $5.8 \times 10^8$ |

EXAMPLE 2

This embodiment is similar to the one described above. The difference lies in the minor component, which is a mixture of compounds, not a single compound as used in Example 1. The minor component in this embodiment comprises $Bi_2O_3$, LiF and $CaF_2$ (1:1:1 by weight). 96.96 grams of $Fe(NO_3)_3 \cdot 9H_2O$ are dissolved in water and an appropriate amount of $NH_4OH$ is added to the solution to precipitate $Fe(OH)_3$. The $Fe(OH)_3$ precipitate is then dissolved in a solution containing 55 grams of citric acid. Upon the citric acid solution becoming transparent, 5.82 grams of $Co(NO_3)_2 \cdot 6H_2O$ and 7.68 grams of $Ba(CH_3COO)_2$ are added. After adjusting the pH to 6-8, the solution becomes a dark-brown sol, which is dried up and calcined at an appropriated temperature to produce dark $Co_2Z$ (Z-type hexaferrite $Ba_3CO_2 Fe_{24}O_{41}$) powder. 20 grams of the $CO_2Z$ powder and an appropriate amount of the above defined minor component (a complex of $Bi_2O_3$, LiF and $CaF_2$) are mixed so that the weight percentage of the minor component is 1.0 (sample 2-1), 1.5 (sample 2-2), 2.0 (sample 2-3), 2.5 (sample 2-4), 3.0 (sample 2-5), 4.0 (sample 2-6), 6.0 (sample 2-7), or 10.0 (sample 2-8). The mixture is ground with iron balls, dried, and pressed into either a disk form or a toroidal form (disks with a outside diameter of 10 mm and a thickness of 1 mm, formed under a pressure of about 2 MPa, or toroidals with a outside diameter of 20 mm, an inside diameter of 10 mm and a thickness of 3 mm, formed under a pressure of about 7 MPa). The disks or toroidals are sintered at 890° C.

Figure 3:
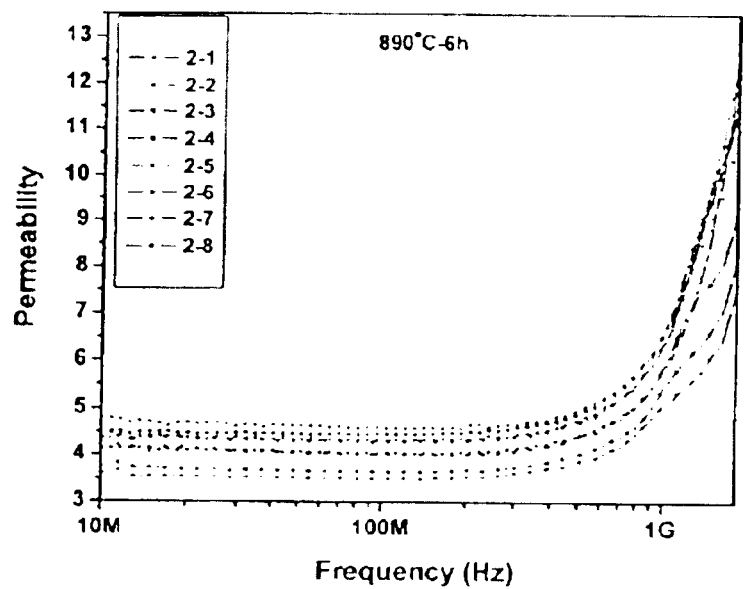
FIG. 3 depicts the relationship between the permeability and the frequency for samples 2-1,2-2, 2–3,2-4, 2–5,2-6, 2–7, and 2-8 made according to the present invention.
Figure 4:
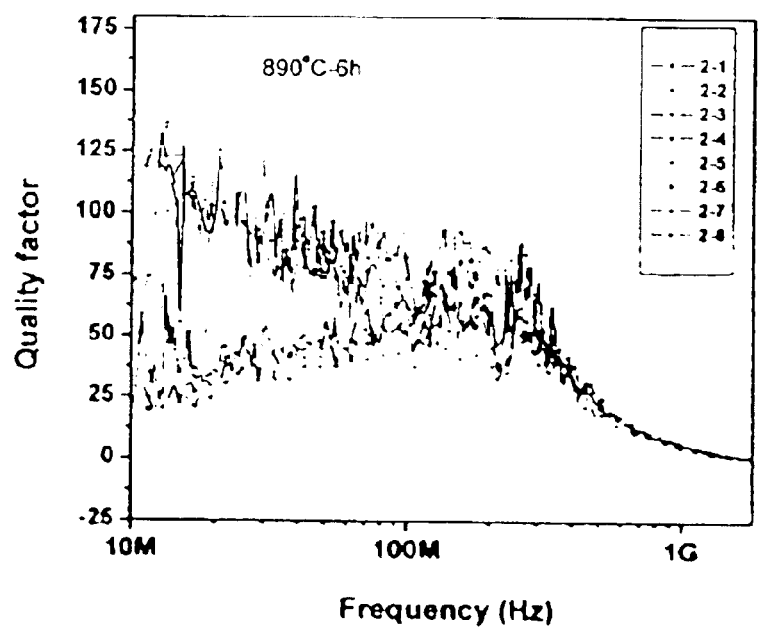
FIG. 4 depicts the relationship between the quality factor and the frequency for samples 2-1,2-2, 2–3,2-4, 2–5,2-6, 2–7, and 2-8 made according to the present invention.

Referring to FIG. 3 and FIG. 4, the initial permeability and quality factor over a range of frequencies are shown for samples 2-1,2-2, 2–3,2-4, 2–5,2-6, 2–7 and 2-8. FIG. 3 shows that the maximum permeability can be obtained when the minor component accounts for 1.5%. FIG. 4 shows that the quality factor at 300 MHz reaches 40 for all the samples. The main electric-magnetic properties of those samples are summarized in Table 2, where $\mu_i$ is initial permeability, Q is quality factor, $(\alpha\mu)_{rel}$ is relative temperature coefficient of inductance, and $\rho$ is insulation resistivity.

TABLE II

| Sample | Condition | $\mu_I$ | Q (300 MHz) | $(\alpha_\mu)_{rel}(/° C.)$ | $\rho$ ($\Omega$.cm) |
|---|---|---|---|---|---|
| 2-1 | 890° C./6 h | 4.4 | 50 | $5.2 \times 10^{-6}$ | $1.9 \times 10^8$ |
| 2-2 | 890° C./6 h | 4.8 | 55 | $1.2 \times 10^{-6}$ | $1.3 \times 10^8$ |
| 2-3 | 890° C./6 h | 4.5 | 50 | $1.6 \times 10^{-6}$ | $2.3 \times 10^8$ |
| 2-4 | 890° C./6 h | 4.6 | 52 | $7.9 \times 10^{-7}$ | $2.8 \times 10^8$ |
| 2-5 | 890° C./6 h | 4.4 | 45 | $1.1 \times 10^{-6}$ | $2.9 \times 10^8$ |
| 2-6 | 890° C./6 h | 4.0 | 54 | $5.8 \times 10^{-7}$ | $2.5 \times 10^8$ |
| 2-7 | 890° C./6 h | 3.7 | 50 | $9.3 \times 10^{-7}$ | $3.2 \times 10^8$ |
| 2-8 | 890° C./6 h | 3.5 | 50 | $1.3 \times 10^{-6}$ | $4.4 \times 10^8$ |

EXAMPLE 3

This embodiment, as in Example 2, uses a complex minor component comprising $Bi_2O_3$, LiF and $CaF_2$ (ratio is 1=1=1 by weight). 80.41 grams of $FeC_6H_5O_7 \cdot 5H_2O$ are dissolved in water. To the solution, 5.82 grams of $Co(NO_3)_2 \cdot 6H_2O$ and 7.68 grams of $Ba(CH_3COO)_2$ are added. After adjusting the pH to 6–8 with citric acid and $NH_4OH$, the solution becomes a dark-brown sol, which is dried up and calcined at an appropriated temperature to produce dark $Co_2Z$ (Z-type hexaferrite in formula $Ba_3CO_2Fe_{24}O_{41}$) powder. 20 grams of the $Co_2Z$ powder and an appropriate amount of the above defined minor component (a complex of $Bi_2O_3$, LiF and $CaF_2$) are mixed so that the minor component accounts for 2% by weight. The mixture is ground with iron balls, dried, and pressed into either disks or toroidals (disks with a outside diameter of 10 mm and a thickness of 1 mm, formed under a pressure of about 2 MPa, or toroidals with a outside diameter of 20 mm, an inside diameter of 10 mm and a thickness of 3 mm, formed under a pressure of about 7 MPa). The disks or toroidals are sintered at 890° C. for 4 hours (sample 3-1), 6 hours (sample 3-2), 8 hours (sample 3-3), or 10 hours (sample 3-4).

Figure 5:
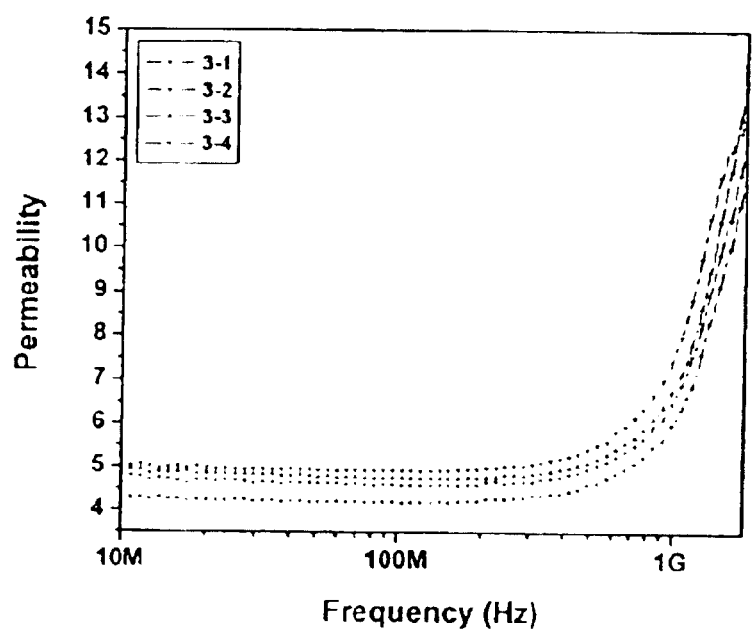
FIG. 5 depicts the relationship between the permeability and the frequency samples 3-1,3-2, 3–3, and 3-4 made according to the present invention.
Figure 6:
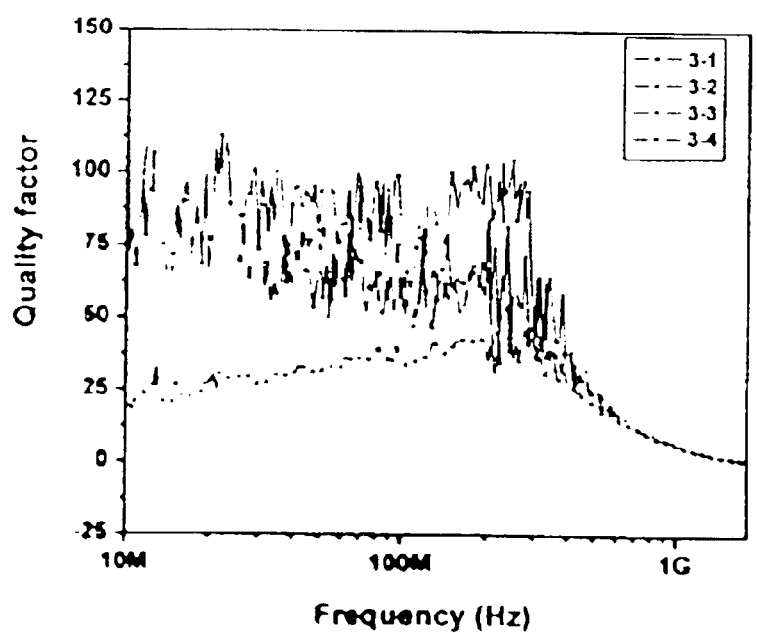
FIG. 6 depicts the relationship between the quality factor and the frequency for samples 3-1,3-2, 3–3, and 3-4 made according to the present invention.

Referring to FIG. 5 and FIG. 6, the permeability and quality factor over a range of frequencies are shown for samples 3-1,3-2, 3–3 and 3-4. It is noted that both the initial permeability and quality factor increases with the duration of sintering incubation. The main electric-magnetic properties of those samples are summarized in Table 3, where $\mu_i$ is initial permeability, Q is quality factor, $(\mu\mu)_{rel}$ is relative temperature coefficient of inductance, and $\rho$ is insulation resistivity.

TABLE III

| Sample | Condition | $\mu_I$ | Q (300 MHz) | $(\alpha_\mu)_{rel}(/° C.)$ | $\rho$ ($\Omega$.cm) |
|---|---|---|---|---|---|
| 3-1 | 890° C./4 h | 4.3 | 65 | $8.7 \times 10^{-7}$ | $1.7 \times 10^8$ |
| 3-2 | 890° C./6 h | 4.8 | 50 | $1.2 \times 10^{-6}$ | $2.3 \times 10^8$ |
| 3-3 | 890° C./8 h | 4.9 | 50 | $1.4 \times 10^{-6}$ | $3.8 \times 10^8$ |
| 3-4 | 890° C./10 h | 5.1 | 45 | $2.9 \times 10^{-6}$ | $5.6 \times 10^8$ |

EXAMPLE 4

The minor component used here is a mixture of $B_2O_3$ and PbO. 80.41 grams of $FeC_6H_5O_7 \cdot 5H_2O$ dissolved in water. To the solution, 5.82 grams of $Co(NO_3)_2 \cdot 6H_2O$ and 7.68 grams of $Ba(CH_3COO)_2$ are added. After adjusting the pH to 6–8 with citric acid and $NH_4OH$, the solution becomes a dark-brown sol, which is dried up and calcined at an appropriated temperature to produce dark $Co_2Z$ (Z-type hexaferrite) powder. 20 grams of the $Co_2Z$ powder and an appropriate amount of the above defined minor component (a complex of $B_2O_3$ and PbO) are mixed so that the minor component's weight accounts for 8% (sample 4-1), 10% (sample 4-2), or 12% (sample 4-3). The mixture is ground with iron balls, dried, and pressed into either disks or toroidals (disks with a outside diameter of 10 mm and a thickness of 1 mm, formed under a pressure of about 2 MPa, or toroidals with a outside diameter of 20 mm, an inside diameter of 10 mm and a thickness of 3 mm, formed under a pressure of about 7 MPa). The disks or toroidals are sintered at 890° C. for 6 hours.

Figure 7:
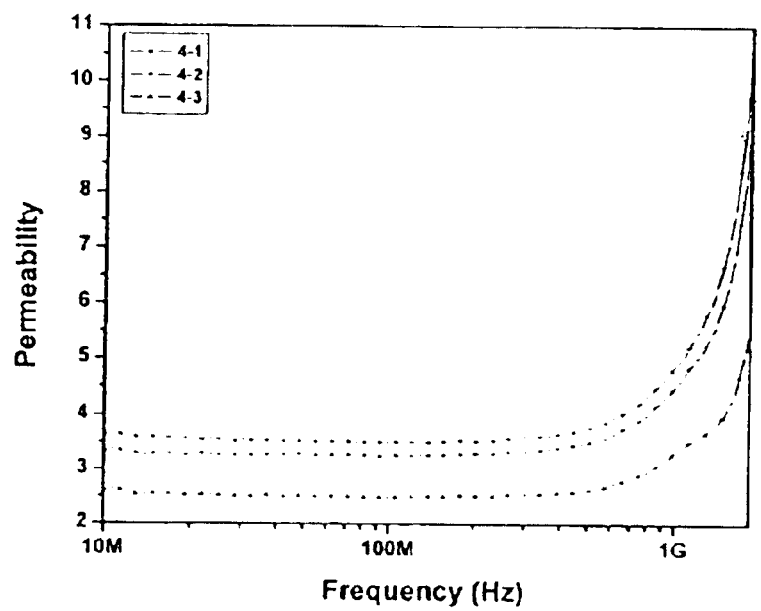
FIG. 7 depicts the relationship between the permeability and the frequency samples 4-1,4-2, and 4-3 according to the present invention.
Figure 8:
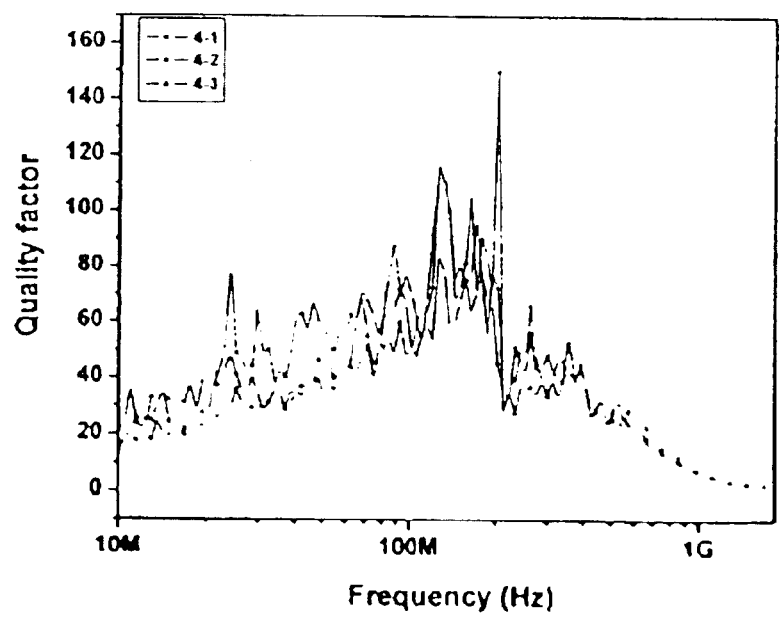
FIG. 8 depicts the relationship between the quality factor and the frequency for samples 4-1,4-2, and 4-3 made according to the present invention.

Referring to FIG. 7 and FIG. 8, the permeability and quality factor over a range of frequencies are shown for samples 4-1,4-2, and 4-3. It is noted that the initial permeability decreases as the percentage of minor component increases. The main electric-magnetic properties of those samples are summarized in Table 4, where $\mu_i$ is initial permeability, Q is quality factor, $(\alpha\mu)_{rel}$ is relative temperature coefficient of inductance, and $\rho$ is insulation resistivity.

TABLE IV

| Sample | Condition | $\mu_I$ | Q (300 MHz) | $(\alpha_\mu)_{rel}(/° C.)$ | $\rho$ ($\Omega$.cm) |
|---|---|---|---|---|---|
| 4-1 | 870° C./6 h | 3.7 | 40 | $2.7 \times 10^{-6}$ | $3.5 \times 10^9$ |
| 4-1 | 870° C./6 h | 3.4 | 50 | $1.1 \times 10^{-6}$ | $2.8 \times 10^9$ |
| 4-3 | 870° C./6 h | 2.6 | 50 | $1.3 \times 10^{-6}$ | $9.6 \times 10^8$ |

EXAMPLE 5

96.96 grams of $Fe(NO_3)_3 \cdot 9H_2O$ are dissolved in water and an appropriate amount of $NH_4OH$ is added to the solution to precipitate $Fe(OH)_3$. The $Fe(OH)_3$ precipitate is then dissolved in a solution containing 55 grams of citric acid. Upon the citric acid solution becoming transparent, 3.49 grams of $Co(NO_3)_2 \cdot 6H_2O$, 1.45 grams of $Cu(NO_3)_2 \cdot 3H_2O$, 0.6 grams of $Zn(NO_3)_2 \cdot H_2O$ and 7.68 grams of $Ba(CH_3COO)_2$ are added. After adjusting the pH to 6–8, the solution becomes a dark-brown sol, which is dried and calcined to produce black Z—Cu6Zn2 powder in formula $Ba_3CO_{2-x-y}Zn_xCu_yFe_{24}O_{41}$, wherein x=0.2, y=0.6 20 grams of the Z—Cu6Zn2 powder is dispersed into ethylene glycol and an appropriate amount of $Bi(NO_3)_3$ (minor component) added, forming a slurry therein. The minor component should account for 2–4% by weight. The slurry is adjusted to a pH value of 7, dried, and pressed into either a disk form or a toroidal form (disks with a outside diameter of 10 mm and a thickness of 1 mm, formed under a pressure of about 2 MPa, or toroidals with a outside diameter of 20 mm, an inside diameter of 10 mm and a thickness of 3 mm, formed under a pressure of about 7 MPa). The disks or toroidals are sintered at 890° C. (sample 5-1) or 920° C. (sample 5-2) for 6 hours.

Figure 9:
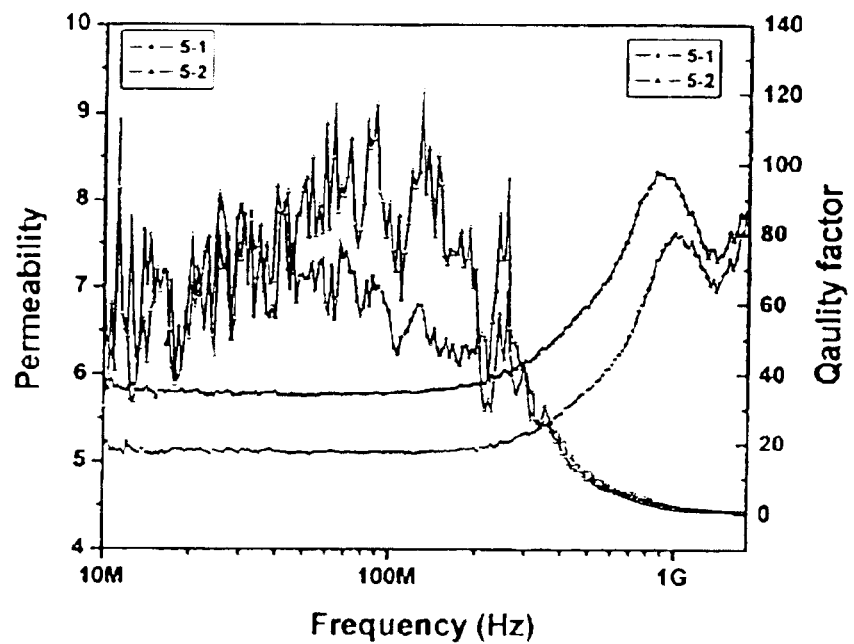
FIG. 9 depicts the relationship between the permeability, the quality factor and the frequency for samples 5-1 and 5-2 made according to the present invention.

The permeability and quality factor over a range of frequencies for samples 5-1 and 5-2 are shown in FIG. 9. The main electric-magnetic properties of those samples are also summarized in Table 5, where $\mu_i$ is initial permeability, Q is quality factor, $(\alpha_\mu)_{rel}$ is relative temperature coefficient of inductance, and $\rho$ is insulation resistivity.

TABLE V

| Sample | Condition | $\mu_I$ | Q (300 MHz) | $(\alpha_\mu)_{rel}(/° C.)$ | $\rho$ ($\Omega$.cm) |
|---|---|---|---|---|---|
| 5-1 | 890° C./6 h | 5.3 | 40 | $6.7 \times 10^{-7}$ | $1.6 \times 10^8$ |
| 5-1 | 920° C./6 h | 6.0 | 45 | $8.9 \times 10^{-7}$ | $1.7 \times 10^8$ |

EXAMPLE 6

96.96 grams of $Fe(NO_3)_3.9H_2O$ are dissolved in water and an appropriate amount of $NH_4OH$ is added to the solution to precipitate $Fe(OH)_3$. The $Fe(OH)_3$ precipitate is then dissolved in a solution containing 55 grams of citric acid. Upon the citric acid solution becoming transparent, 4.07 grams of $Co(NO_3)_2.6H_2O$, 1.45 grams of $Cu(NO_3)_2.3H_2O$, and 7.68 grams of $Ba(CH_3COO)_2$ are added. After adjusting the pH to 6–8, the solution becomes a dark-brown sol, which is dried and calcined to produce black Z—Cu6 powder in formula $Ba_3Co_{2-x-y}Zn_zCu_yFe_{24}O_{41}$. 20 grams of the Z—Cu6 powder is dispersed into ethylene glycol and an appropriate amount of $Bi(NO_3)_3$ (minor component) added, forming a slurry therein. The minor component should account for 4% by weight. The slurry is adjusted to a pH value of 7, dried, and pressed into either a disk form or a toroidal form (disks with a outside diameter of 10 mm and a thickness of 1 mm, formed under a pressure of about 2 MPa, or toroidals with a outside diameter of 20 mm, an inside diameter of 10 mm and a thickness of 3 mm, formed under a pressure of about 7 MPa). The disks or toroidals are sintered at 890° C. (sample 6-1) or 920° C. (sample 6-2) for 6 hours.

Figure 10:
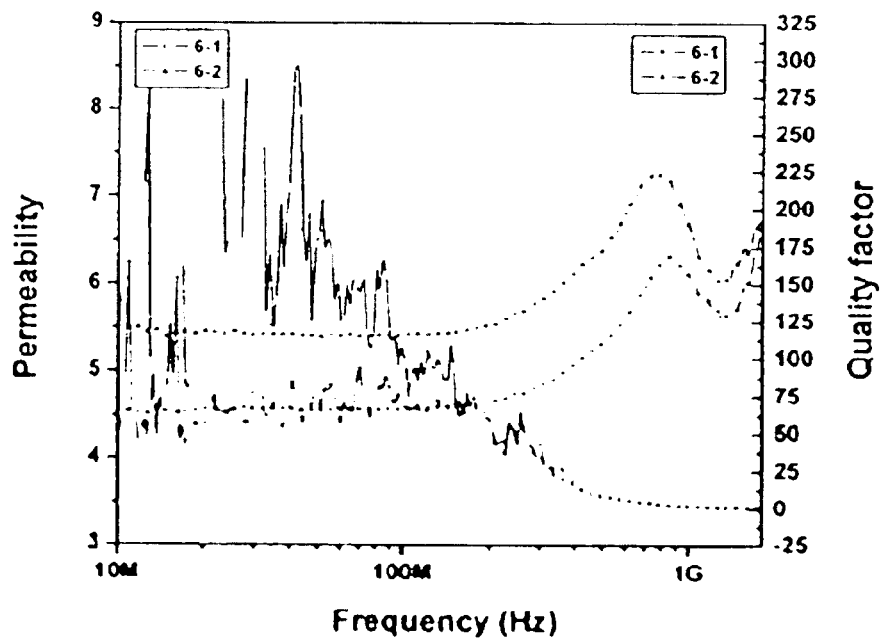
FIG. 10 depicts the relationship between the permeability, the quality factor and the frequency for samples 6-1 and 6-2 made according to the present invention.

The permeability and quality factor over a range of frequencies for samples 6-1 and 6-2 are shown in FIG. 10. The main electric-magnetic properties of those samples are also summarized in Table 6, where $\mu_i$ is initial permeability, Q is quality factor, $(\alpha_\mu)_{rel}$ is relative temperature coefficient of inductance, and $\rho$ is insulation resistivity.

In this example, the amounts of the precursor compounds can be varied to produce a modified $Co_2Z$ hexaferrite in formula $Ba_3Co_{2-x-y}Zn_x Cu_y Fe_{24}O_{41}$, wherein X=0.4 and y=0.4 (x and y are defined elsewhere in this disclosure). Using this $Co_2Z$ hexaferrite and follow the same produce described in the preceding paragraphs of this example, disks or toroidals of the same dimentions can be produced and sintered at 890° C. (sample 9-2) for 6 hours.

Figure 13:
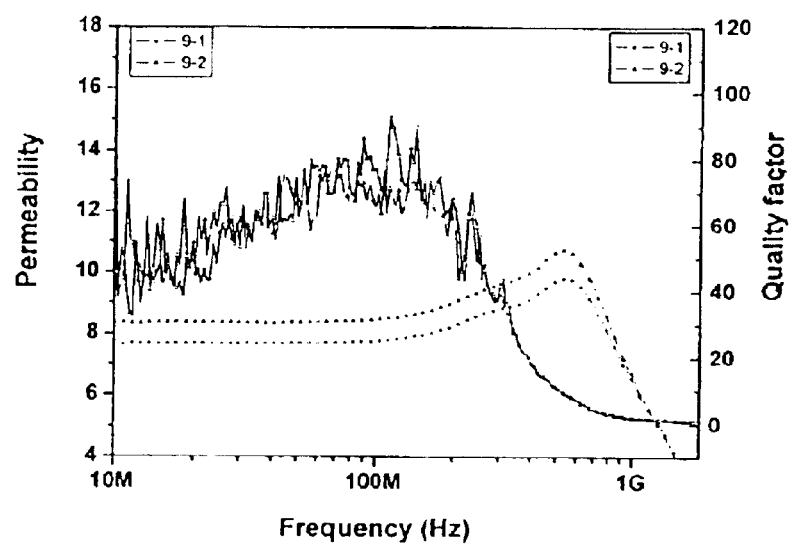
FIG. 13 depicts the relationship between the permeability, the quality factor and the frequency for samples 9-1 and 9-2 made according to the present invention

The premeability and quality factor over a range of frequencies for samples 9-1 and 9-2 are shown in FIG. 13. The main electric-magnetic properties of those samples are also summarized in Table 9, where $\mu_I$ is initial premebility, Q is quality factor, $(\ )_{rei}$ is relative temperature coefficient of inductance, and is insulation resistivity.

TABLE VI

| Sample | Condition | $\mu_I$ | Q (300 MHz) | $(\alpha_\mu)_{rel}(/° C.)$ | $\rho$ ($\Omega$.cm) |
|---|---|---|---|---|---|
| 6-1 | 890° C./6 h | 4.8 | 40 | $1.0 \times 10^{-6}$ | $7.8 \times 10^8$ |
| 6-2 | 920° C./6 h | 5.9 | 40 | $2.3 \times 10^{-6}$ | $5.9 \times 10^8$ |

TABLE IX

| Sample | Condition | $\mu_I$ | Q (300 MHz) | $(\alpha_\mu)_{rel}(/° C.)$ | $\rho$ ($\Omega$.cm) |
|---|---|---|---|---|---|
| 9-1 | 890° C./6 h | 7.7 | 40 | $3.3 \times 10^{-6}$ | $6.6 \times 10^{10}$ |
| 9-2 | 920° C./6 h | 8.3 | 40 | $3.4 \times 10^{-6}$ | $9.3 \times 10^{10}$ |

EXAMPLE 7

80.41 grams of $FeC_6H_5O_7.5H_2O$ are dissolved in water. To the solution, 5.82 grams of $Co(NO_3)_2.6H_2O$ and 7.68 grams of $Ba(CH_3COO)_2$ are added. After adjusting the pH to 6–8, the solution becomes a dark-brown sol, which is dried and calcined to produce black Z-type hexaferrite powder. 20 grams of the hexaferrite powder is dispersed into ethylene glycol and an appropriate amount of $Bi(NO_3)_3$ (minor component) added, forming a slurry therein. The minor component should account for 4% by weight. The slurry is adjusted to a pH value of 7, dried, and pressed into either a disk form or a toroidal form (disks with a outside diameter of 10 mm and a thickness of 1 mm, formed under a pressure of about 2 MPa, or toroidals with a outside diameter of 20 mm, an inside diameter of 10 mm and a thickness of 3 mm, formed under a pressure of about 7 MPa). The disks or toroidals are sintered at 890° C. (sample 7-1) or 920° C. (sample 7-2) for 6 hours.

Figure 11:
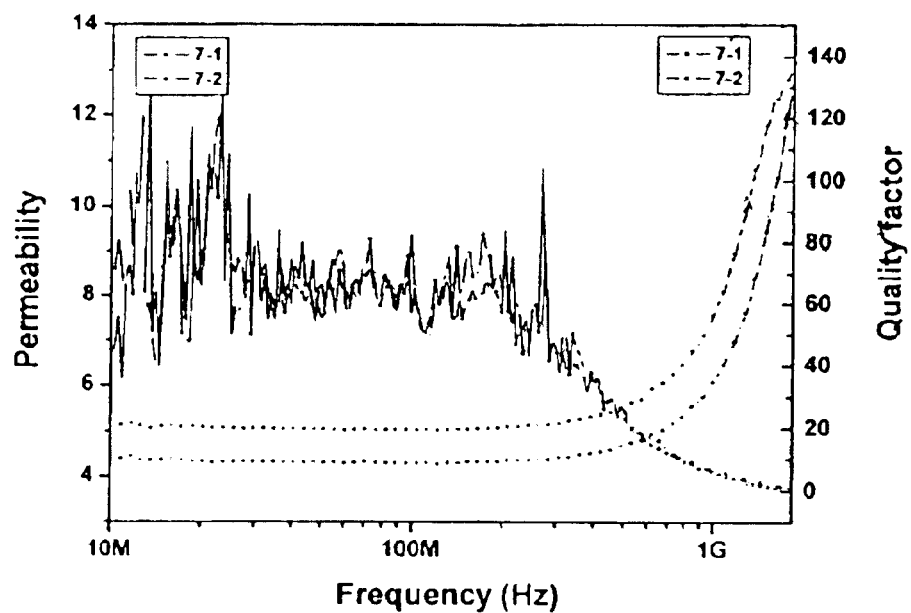
FIG. 11 depicts the relationship between the permeability, the quality factor and the frequency for samples 7-1 and 7-2 made according to the present invention.

The permeability and quality factor over a range of frequencies for samples 7-1 and 7-2 are shown in FIG. 11. The main electric-magnetic properties of those samples are also summarized in Table 7, where $\mu_i$ is initial permeability, Q is quality factor, $(\alpha_\mu)_{rel}$ is relative temperature coefficient of inductance, and $\rho$ is insulation resistivity.

TABLE VII

| Sample | Condition | $\mu_I$ | Q (300 MHz) | $(\alpha_\mu)_{rel}(/° C.)$ | $\rho$ ($\Omega$.cm) |
|---|---|---|---|---|---|
| 7-1 | 890° C./6 h | 4.4 | 50 | $5.4 \times 10^{-7}$ | $6.1 \times 10^8$ |
| 7-2 | 920° C./6 h | 5.2 | 50 | $7.1 \times 10^{-7}$ | $9.5 \times 10^8$ |

EXAMPLE 8

A complex minor component is used in this embodiment, which comprises $Bi(NO_3)_3$, $Li_2(CH_3COO)$ and $Ca(NO_3)_2$ (ratio 1:1:1 by weight). 80.41 grams of $FeC_6H_5O_7 5H_{2O}$ are dissolved in water. To the solution, 3.49 grams of $Co(NO_3)_2.6H_2O$, 1.45 grams of $Cu(NO_3)_2.3H_2O$, 0.6 grams of $Zn(NO_3)_2.H_2O$ and 7.68 grams of $Ba(CH_3COO)_2$ are added. After adjusting the pH to 6–8, the solution becomes a dark-brown jelly, which is dried and calcined to produce black Z—Cu6Zn2 powder in formula $Ba_3CO_{2-x-y} Zn_xCu_yFe_{24}O_{41}$ wherein x=0.2 and y=0.6. 20 grams of the hexaferrite powder is dispersed into ethylene glycol and an appropriate amount of the above-specified minor component is added, forming a slurry therein. The minor component should account for 3% by weight. The slurry is adjusted to a pH value of 7, dried, and pressed into either a disk form or a toroidal form (disks with a outside diameter of 10 mm and a thickness of 1 mm, formed under a pressure of about 2 MPa, or toroidals with a outside diameter of 20 mm, an inside diameter of 10 mm and a thickness of 3 mm, formed under a pressure of about 7 MPa). The disks or toroidals are sintered at 890° C. (sample 8-1) or 920° C. (sample 8-2) for 6 hours.

Figure 12:
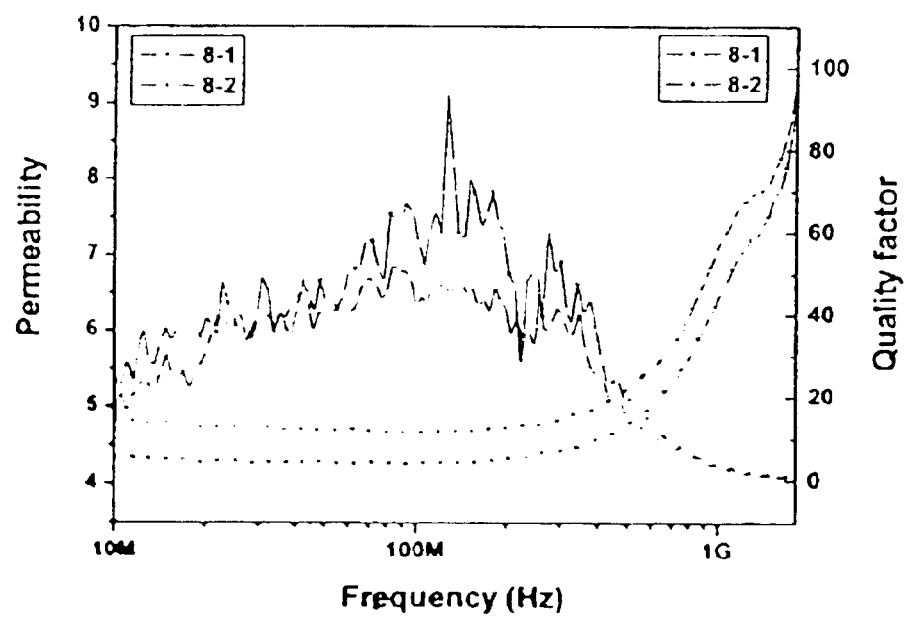
FIG. 12 depicts the relationship between the permeability, the quality factor and the frequency for samples 8-1 and 8-2 made according to the present invention.

The permeability and quality factor over a range of frequencies for samples 7-1 and 7-2 are shown in FIG. 12. The main electric-magnetic properties of those samples are also summarized in Table 8, where $\mu_i$ is initial permeability, Q is quality factor, $(\alpha_\mu)_{rel}$ is relative temperature coefficient of inductance, and $\rho$ is insulation resistivity.

TABLE VIII

| Sample | Condition | $\mu_i$ | Q (300 MHz) | $(\alpha_\mu)_{rel}(/° C.)$ | $\rho$ (Ω.cm) |
|---|---|---|---|---|---|
| 8-1 | 890° C./6 h | 4.3 | 50 | $2.7 \times 10^{-6}$ | $3.5 \times 10^8$ |
| 8-2 | 920° C./6 h | 4.8 | 45 | $1.5 \times 10^{-6}$ | $5.2 \times 10^8$ |

EXAMPLE 9

In this embodiment, Z—Mn2 hexaferrite in formula $Ba_3CO_{2-x-y} Zn_xCu_yFe_{24}O_{41}$, (wherein Z=0.2, W=0.8) is the major component. The minor component comprises $Bi_2O_3$ and $V_2O_5$ (ratio of 1:1 by weight). 92.2 grams of $Fe(NO_3)_3$ $9H_2O$ are dissolved in water and an appropriate amount of $NH_4OH$ is added to precipitate $Fe(OH)_3$. The $Fe(OH)_3$ precipitate is then dissolved in a solution containing 55 grams of citric acid. Upon the citric acid solution becoming transparent, 5.82 grams of $Co(NO_3)_2$ $6H_2O$, 7.68 grams of $Ba(CH3COO)2$ and 0.358 gram of $Mn(NO_3)2$ are added. After adjusting the pH to 6-8, the solution becomes a dark-brown sol, which is dried and calcined at an appropriated temperature to produce dark Z—Mn2 hexaferrite powder, 20 grams of the powder and an appropriate amount of the above defined minor component are mixed so that the weight percentage of the minor component is 2.0%. The mixture is ground, dried and pressed into either disks or torodials (disk with an outside diameter of 10 mm and a thickness of 1 mm, formed under a pressure of about 2 Mpa, or torodails with an outside diameter of 20 mm, an inside diameter of 10 mm and a thickness of 3 mm, formed under a pressure of about 7 Mpa). The disks or torodails are sintered at 870° C. (sample 10-1), 890° C. (sample 10-2) and 920° C. (sample 10-3).

The foregoing examples demonstrate that the new material prepared according to the present invention using lower sintering temperatures represents significant improvement in sintering behavior, homogeneity of grain size, density, initial permeability, quality factor, insulation resistivity and natural ferromagnetic resonance at frequencies over 1.0 GHz. Therefore, it process a great potential as a soft magnetic material for manufacturing hfMLCIs.

Figure 14:
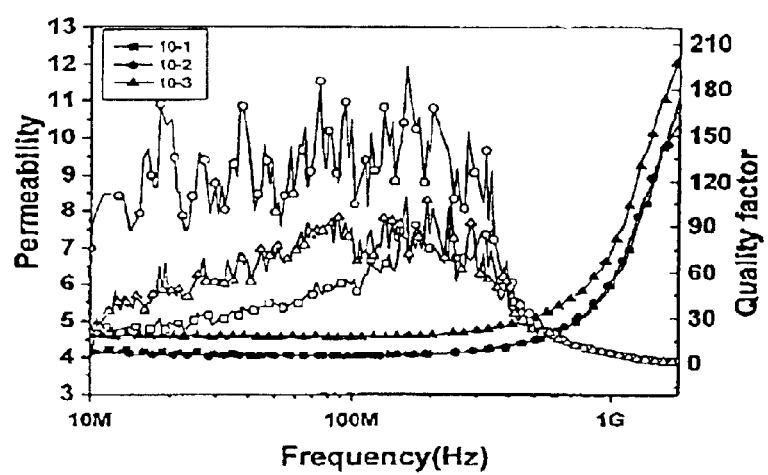
FIG. 14 depicts the relationship between the permeability, the quality factor and the frequency for samples 10-1 and 10-2 made according to the present invention.

FIG. 14 shows the permeability and quality factor over a range of frequencies for samples 10-1, 10–2 and 10-3. For all the samples the initial permeability is above 4 and the quality factor at 300 MHz is above 60. The main electric-magnetic properties of the samples are also summarized in table 10, where $\mu_I$ is the initial permeability, Q is quality factor, $(\alpha_\mu)_{rel}$ is relative temperature coefficient of inductance, and $\rho$ is insulation resistivity.

TABLE X

| Sample | Condition | $\mu_I$ | Q (300 MHz) | $(\alpha_\mu)_{rel}(/° C.)$ | $\rho$ (Ω.cm) |
|---|---|---|---|---|---|
| 10-1 | 890° C./6 h | 4.2 | 80 | $2.5 \times 10^{-6}$ | $7.8 \times 10^8$ |
| 10-2 | 920° C./6 h | 4.3 | 90 | $1.8 \times 10^{-6}$ | $9.5 \times 10^8$ |
| 10-3 | 950° C./6 h | 4.7 | 60 | $1.7 \times 10^{-6}$ | $1.2 \times 10^9$ |

The foregoing examples demonstrate that the new material prepared according to the present invention using lower sintering temperatures represents significant improvement in sintering behavior, homogeneity of grain size, density, initial permeability, quality factor, insulation resistivity and natural ferromagnetic resonance at frequencies over 1.0 GHz. Therefore, it process a great potential as a soft magnetic material for manufacturing hfMLCIs.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A composition of hyper frequency multilayer chip inductors materials comprising:

a major component Z-type planar hexaferrite as following:

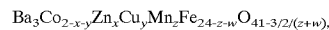

$Ba_3Co_{2-x-y}Zn_xCu_yMn_zFe_{24-z-w}O_{41-3/2(z+w)}$, wherein:

$0 \leq x \leq 1.0$; $0 \leq y \leq 0.8$; $0 \leq 1.0$; and $0 \leq w \leq 1.0$; and a rumor component used as a sintering aid as following:

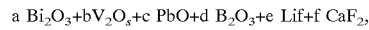

a $Bi_2O_3$+b$V_2O_5$+c PbO+d $B_2O_3$+e Lif+f $CaF_2$, wherein:

$0 \leq a \leq 1$; $0 \leq b'1$; $0 \leq c \leq 1$; $0 \leq d \leq 1$; $0 \leq e \leq 1$; $0 \leq f \leq 1$;

wherein the weight ratio of the major component to the minor component is between 98:2 to 88:12.
2. The composition of claim 1 wherein a=0; b=0.
3. The composition of claim 2 wherein $0<c \leq 1$.
4. The composition of claim 2 wherein $0<d<1$.

* * * * *